(12) United States Patent
Ye et al.

(10) Patent No.: US 10,215,312 B2
(45) Date of Patent: Feb. 26, 2019

(54) HEMP-WINDING COMPOSITE PIPE

(71) Applicants: ZHEJIANG XINZHOU BAMBOO-BASED COMPOSITES TECHNOLOGY CO., LTD., Hangzhou (CN); Ling Ye, Huzhou (CN)

(72) Inventors: Ling Ye, Huzhou (CN); Lin Niu, Huzhou (CN)

(73) Assignees: ZHEJIANG XINZHOU BAMBOO-BASED COMPOSITES TECHNOLOGY CO., LTD., Hangzhou (CN); Ling Ye, Huzhou (CN)

( * ) Notice: Subject to any disclaimer, the term of this patent is extended or adjusted under 35 U.S.C. 154(b) by 0 days.

(21) Appl. No.: 15/785,406

(22) Filed: Oct. 16, 2017

(65) Prior Publication Data

US 2018/0038521 A1 Feb. 8, 2018

Related U.S. Application Data

(63) Continuation-in-part of application No. PCT/CN2015/092317, filed on Oct. 20, 2015.

(30) Foreign Application Priority Data

Jul. 23, 2015 (CN) .................... 2015 2 0538455 U

(51) Int. Cl.
*F16L 9/14* (2006.01)
*F16L 9/01* (2006.01)

(52) U.S. Cl.
CPC .. *F16L 9/14* (2013.01); *F16L 9/01* (2013.01)

(58) Field of Classification Search
CPC .................................... F16L 9/01; F16L 9/14
USPC ...................... 138/137, 141, 140, 125, 124
See application file for complete search history.

(56) References Cited

U.S. PATENT DOCUMENTS

| | | | | |
|---|---|---|---|---|
| 4,397,337 A | * | 8/1983 | Porrmann | A22C 13/0013 138/118.1 |
| 6,455,115 B1 | * | 9/2002 | DeMeyer | F16L 9/12 428/36.2 |
| 6,460,575 B1 | * | 10/2002 | De Meyer | F16L 9/12 138/124 |
| 6,837,273 B2 | * | 1/2005 | Woolstencroft | B29D 23/001 138/125 |
| 7,096,890 B2 | * | 8/2006 | Woolstencroft | F16L 55/1656 138/125 |
| 7,478,650 B2 | * | 1/2009 | Pleydon | B32B 7/12 138/98 |
| 2001/0045236 A1 | * | 11/2001 | Verschueren | A22C 13/0013 138/118.1 |

* cited by examiner

*Primary Examiner* — Patrick F Brinson
(74) *Attorney, Agent, or Firm* — Matthias Scholl P.C.; Matthias Scholl

(57) ABSTRACT

A hemp-winding composite pipe including a lining layer, a reinforcement layer winding on the lining layer, and an external protective layer, in that order from the inside to the outside in the radial direction. The reinforcement layer is a hemp bast layer, including continuously connected hemp basts.

12 Claims, 3 Drawing Sheets

HEMP-WINDING COMPOSITE PIPE

CROSS-REFERENCE TO RELATED APPLICATIONS

This application is a continuation-in-part of International Patent Application No. PCT/CN2015/092317 with an international filing date of Oct. 20, 2015, designating the United States, now pending, and further claims foreign priority to Chinese Patent Application No. 201520538455.9 filed Jul. 23, 2015. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The present disclosure relates to a hemp-winding composite pipe.

Description of the Related Art

Currently, cement pipes, polyvinyl chloride pipes, polyethylene pipes, polypropylene pipes, glass reinforced plastics pipes, and thin-wall iron pipes are widely used for agricultural irrigation, water drainage, and building ventilation.

Cement pipes have low strength, heavy weight, and leaky pipe joints. Polyvinyl chloride pipes, polyethylene pipes, and polypropylene pipes are low in rigidity and strength, and the raw materials used to make the same are synthetic petrochemicals. Glass reinforced plastics pipes and glass reinforced plastic sand pipes contain glass fiber, the production of which consumes a relatively large amount of energy. Thin-wall iron pipes have poor corrosion resistance, and making them requires high energy consumption and leads to high environmental pollution.

SUMMARY OF THE INVENTION

In view of the above-described problems, it is one objective of the invention to provide a hemp-winding composite pipe that is light, environmentally friendly, and features the requisite amount of rigidity and strength.

To achieve the above objective, in accordance with one embodiment of the invention, there is provided a hemp-winding composite pipe comprising a lining layer, a reinforcement layer winding on the lining layer, and an external protective layer in that order from inside to outside in a radial direction; and the reinforcement layer is a hemp bast layer comprising continuously connected hemp basts.

The hemp-winding composite pipe of the present disclosure employs natural hemp basts with appropriate strength as a reinforcing material; and the hemp basts are treated using a winding process to manufacture a pipe having zero pollution, light weight, appropriate tensile strength, and which is easy to transport and assemble. The pipe can be used to substitute for existing industrial pipes which are energy-consuming and not environmental friendly; therefore, the petroleum resources can be saved, and environmental pollution can be reduced. Moreover, the continuous and long hemp bast layer formed by connected hemp basts facilitates the continuous production and improves the production efficiency.

In a class of this embodiment, the hemp basts are disposed in parallel on the hemp bast layer in a forward direction and in a backward direction alternately. Because the hemp stem has certain conicity, the peeled and dried hemp bast is presented as a trapezoid having one relatively wide end and one relatively narrow end; and the hemp basts have relatively strong mechanical strength at the root and relatively weak mechanical strength on the top. In order to ensure uniform strength of the hemp bast prepared on the wall of the composite pipe winding uniformly, the hemp basts are disposed and laid in parallel in a forward direction and a backward direction alternately; in this way, the hemp basts can be compensated for each other in aspects of form and strength.

In a class of this embodiment, the reinforcement layer comprises a hoop reinforcement layer and a helical crossing reinforcement layer; the hemp bast layers in the hoop reinforcement layer are hoop winding; and the hemp bast layers in the helical crossing reinforcement layer are helically crossing winding. The stresses in all direction are distributed uniformly due to helical and crossing winding; and the hoop tensile and compressive strength of a big pipe can be increased because of hoop arrangement and winding. Because hemp, as the natural plant, has the characteristics of anisotropy, a winding method combining the helical and crossing winding and hoop arrangement and winding is taken to process and produce, which not only makes up the strength in each direction, but strengthen the compressive tensile strengths in the hoop direction.

In a class of this embodiment, the hemp-winding composite pipe further comprises an auxiliary reinforcement layer between the reinforcement layers. The auxiliary reinforcement layer is a daub layer formed by a resin and a filler. Because the hemp has a small elastic modulus, the auxiliary reinforcement layer shall be added in order to meet the requirement of higher mechanical properties and make the pipe has higher rigidity and strength. Furthermore, the filler capable of increasing the strength and rigidity of the pipe is used as the main reinforcement material of the auxiliary reinforcement layer.

In a class of this embodiment, the filler is an inorganic filler or natural plant filler; and the inorganic filler or natural plant filler having high strength and free pollution is selected, thus improving the mechanical properties of the product, and the composite pipe is green and environmentally friendly.

In a class of this embodiment, the natural plant filler is wood chips, wood flour, bamboo chip, bamboo powder, powdered fruit shell, or a mixture thereof; and the above-mentioned national plant fillers have nice strength and low cost, and is easily available.

DETAILED DESCRIPTION OF THE EMBODIMENTS

For further illustrating the invention, experiments detailing a hemp-winding composite pipe are described hereinbelow combined with the drawings. It should be noted that the following examples are intended to describe and not to limit the invention.

Example 1

Preparation of a hemp-winding composite pipe with a nominal diameter of 150 mm and pressure rating of 0.4 MPa.

Figure 1:
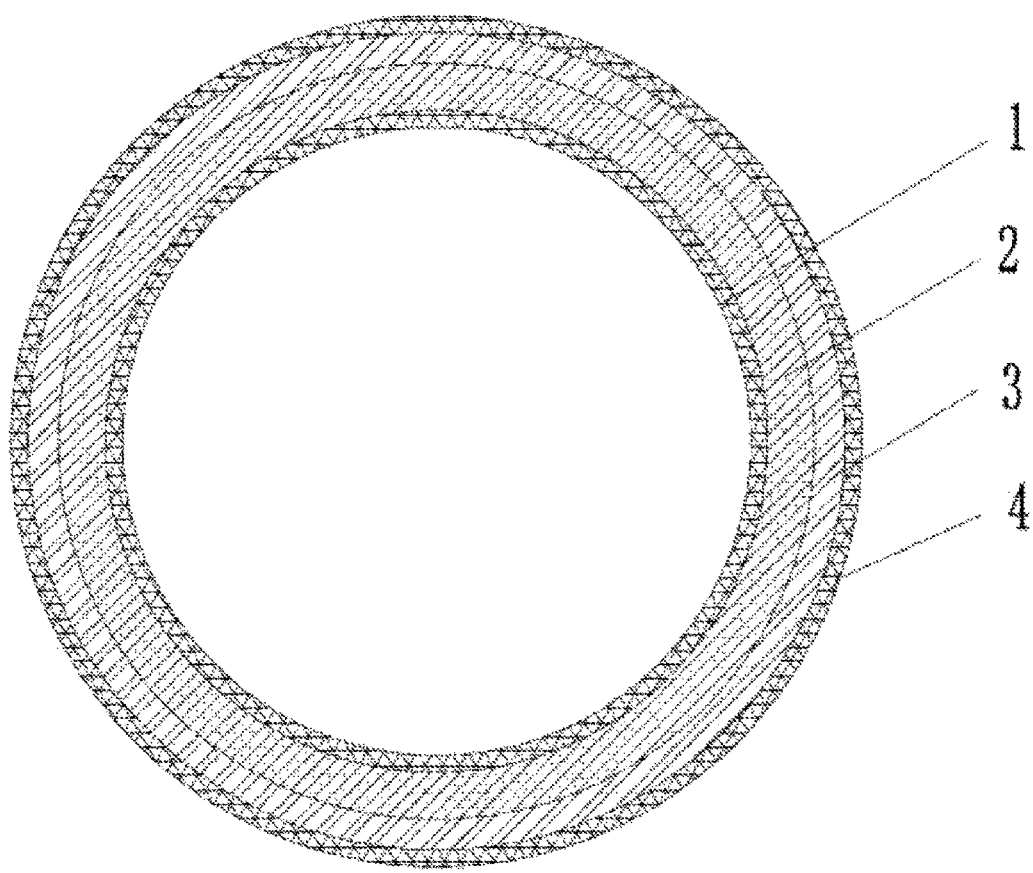
FIG. 1 is a schematic diagram of a hemp-winding composite pipe in a radial direction in Example 1 of the present disclosure.
Figure 3A:
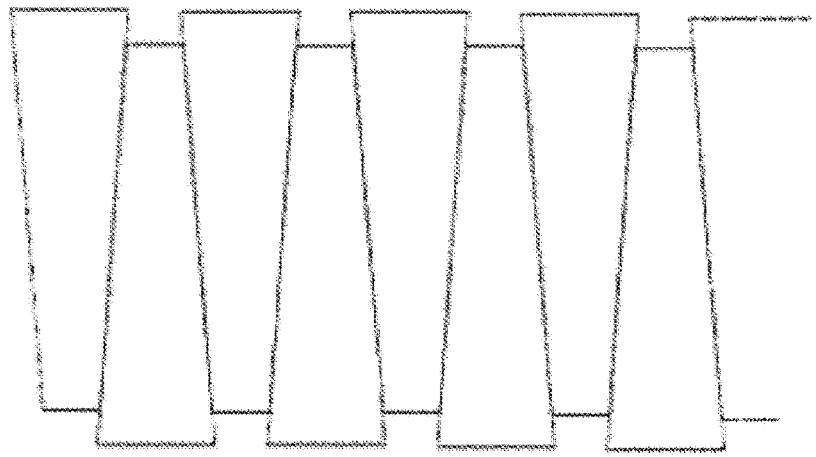
FIGS. 3A-3C show three arrangement modes of hemp basts on a hemp bast layer according to embodiment of the present disclosure.
Figure 3B:
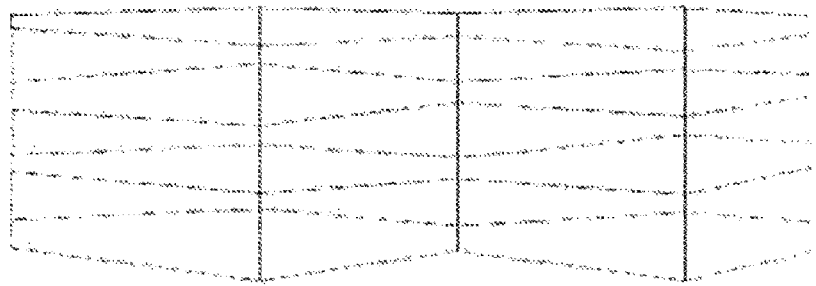
Figure 3C:
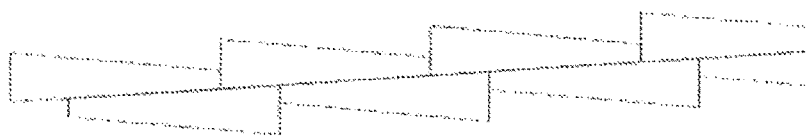

As shown in FIG. 1, the pipe comprises a lining layer 1, a helical reinforcement layer 2, a hoop reinforcement layer 3 and an external protective layer 4 in that order from inside to outside in a radial direction; and the pipe is prepared as follows:

(1) Pre-treatment of hemp basts: mechanically peeling off hemp basts, drying, and adhering the hemp basts to a gridding cloth in parallel in a forward direction and a backward direction alternately, where the arrangement method of the hemp basts is shown in FIGS. 3A-3C; and selecting one of the arrangement methods to prepare a continuous and long hemp bast layer;

(2) Preparation of the lining layer 1: uniformly coating one layer of release agent on a polished steel mold with an outer diameter of 150 mm to form a demolding coating; winding a 0.3 mm thick needled mat and non-woven fabrics coated with anti-corrosive resin on the demolding coating; and heating and curing the needled mat and non-woven fabrics to form the lining layer 1;

(3) Preparation of the helical crossing reinforcement layer 2: adding resin to a resin tank of a winding machine; unreeling the hemp bast layer from the winding machine and coating the resin while passing the resin tank; then winding a 4 mm thick hemp bast layer on the lining layer 1, to form the helical crossing reinforcement layer 2;

(4) Preparation of the hoop reinforcement layer 3: continuously winding the hemp bast layer annularly until a thickness thereof achieves 2 mm, to form the hoop reinforcement layer 3;

(5) Curing: heating and curing the pipe, crosslinking and curing the resin, and grinding and trimming the pipe surface;

(6) Preparation of the external protective layer 4: spraying a 1.0 mm thick layer of anti-corrosive waterproof resin on the pipe surface, to form the external protective layer 4, and demolding.

A short-time hydraulic failure pressure of the hemp-winding composite pipe prepared is 0.4 MPa, a rigidity thereof is 5000 N/m$^2$, and a hoop tensile strength thereof is 120 kN/m; and the pipe meets the technical indexes of the pressure pipe.

Example 2

Preparation of a hemp-winding composite pipe with a nominal diameter of 1400 mm and pressure rating of 0.6 MPa.

Figure 2:
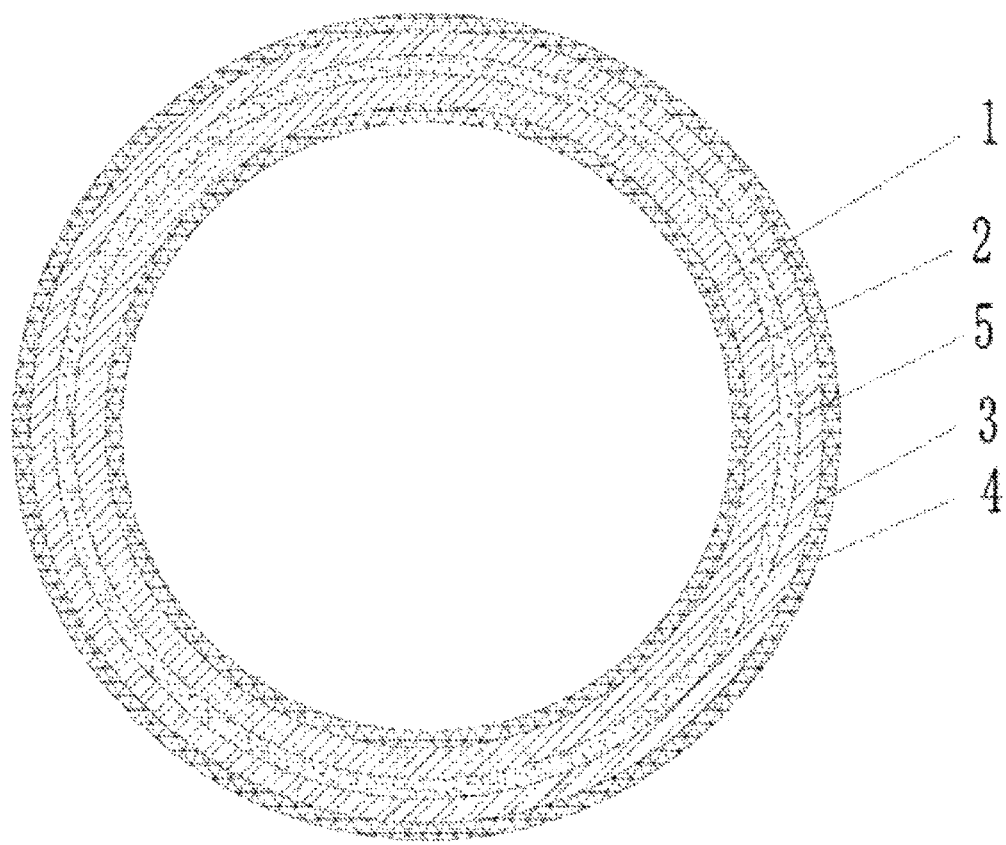
FIG. 2 is a schematic diagram of a hemp-winding composite pipe in a radial direction in Example 2 of the present disclosure.

As shown in FIG. 2, the pipe comprises a lining layer 1, a helical crossing reinforcement layer 2, an auxiliary reinforcement layer 5, a hoop reinforcement layer 3 and an external protective layer 4 in that order from inside to outside in a radial direction; and the pipe is prepared as follows:

(1) Pre-treatment of the hemp basts: the same as that in Example 1;

(2) Preparation of the lining layer 1: uniformly coating one layer of release agent on the polished steel mold with outer diameter of 1400 mm, and winding the needled mat and non-woven fabrics coated with anti-corrosive resin on the demolding coating for 3-4 layers until a thickness thereof achieves 1.5 mm, and heating and curing the needled mat and non-woven fabrics to form the lining layer 1;

(3) Preparation of the helical crossing reinforcement layer 2: the same as that in Example 1, where the winding thickness is 30 mm;

(4) Preparations of the auxiliary reinforcement layer 5: mixing and stirring resin and an inorganic filler or a natural plant filler to form the daub, where the inorganic filler is stone powder, ore sand, etc.; the natural plant filler is wood chips, wood flour, bamboo chip, bamboo powder, powdered fruit shell, or a mixture thereof; the mass ratio of the filler is 70-90%, and the mass ratio of resin is 10-30%. In this example, the ore sand is selected as the filler; the daub mixed is adhered to one layer of lining cloth uniformly; the lining cloth to which daub is adhered is wrapped on the helical crossing reinforcement layer 2, tightening up and compacting it until a thickness thereof achieves 10 mm, to form the auxiliary reinforcement layer 5;

(5) Preparation of the hoop reinforcement layer 3: the same as that in Example 1, where the winding thickness is 20 mm;

(6) Curing: the same as that in Example 1;

(7) Preparation of the external protective layer 4: spraying one layer of asphalt on the pipe surface until a thickness thereof achieves 1.5 mm, to form the external protective layer 4, and demolding.

The short-time hydraulic failure pressure of the hemp-winding composite pipe prepared is 0.6 MPa, the rigidity thereof is 7500 N/m$^2$, and the hoop tensile strength thereof is 1680 kN/m; and the pipe meets the technical indexes of the pressure pipe.

Example 3

Preparation of a hemp-winding composite pipe with a nominal diameter of 1400 mm and pressure rating of 0.6 MPa.

Preparation method of an auxiliary reinforcement layer 5 in Example 3: uniformly scattering a filler on the surface of a helical crossing reinforcement layer 2 directly while spraying the resin; then wrapping the helical crossing reinforcement layer 2 with the lining cloth, tightening up and compacting, to form the auxiliary reinforcement layer 5 with a thickness of 10 mm Other operations are the same that in Example 2.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A composite pipe comprising: a lining layer, a reinforcement layer winding on the lining layer, and an external protective layer in that order from the inside to the outside in a radial direction; wherein the reinforcement layer is a hemp bast layer comprising continuously connected hemp basts.

2. The pipe of claim 1, wherein the hemp basts are disposed in parallel on the hemp bast layer in a forward direction and in a backward direction alternately.

3. The pipe of claim 1, wherein the reinforcement layer comprises a hoop reinforcement layer and a helical crossing reinforcement layer; the hemp bast layer in the hoop reinforcement layer is formed by hoop winding; and the hemp bast layer in the helical reinforcement layer is formed by helical winding.

4. The pipe of claim 1, further comprising an auxiliary reinforcement layer between reinforcement layers, wherein the auxiliary reinforcement layer is a daub layer comprising a resin and a filler.

5. The pipe of claim 2, further comprising an auxiliary reinforcement layer between reinforcement layers, wherein the auxiliary reinforcement layer is a daub layer comprising a resin and a filler.

6. The pipe of claim 3, further comprising an auxiliary reinforcement layer between reinforcement layers, wherein the auxiliary reinforcement layer is a daub layer comprising a resin and a filler.

7. The pipe of claim 4, wherein the filler is an inorganic filler or natural plant filler.

8. The pipe of claim 5, wherein the filler is an inorganic filler or natural plant filler.

9. The pipe of claim 6, wherein the filler is an inorganic filler or natural plant filler.

10. The pipe of claim 7, wherein the natural plant filler comprises wood chips, wood flour, bamboo chips, bamboo powder, powdered fruit shell, or a mixture thereof.

11. The pipe of claim 8, wherein the natural plant filler comprises wood chips, wood flour, bamboo chip, bamboo powder, powdered fruit shell, or a mixture thereof.

12. The pipe of claim 9, wherein the natural plant filler comprises wood chips, wood flour, bamboo chip, bamboo powder, powdered fruit shell, or a mixture thereof.

\* \* \* \* \*